Figure 1:
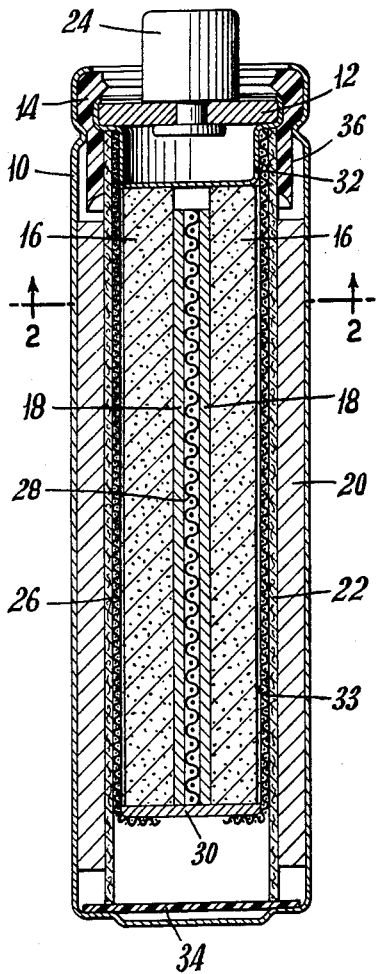

Sept. 26, 1961  J. L. S. DALEY  3,002,041
METHOD OF CONSTRUCTING NICKEL-CADMIUM CELLS
Filed Aug. 10, 1959  2 Sheets-Sheet 1

INVENTOR.
JOHN L. S. DALEY
BY
*John F. Hohmann*
ATTORNEY

Sept. 26, 1961 J. L. S. DALEY 3,002,041
METHOD OF CONSTRUCTING NICKEL-CADMIUM CELLS
Filed Aug. 10, 1959 2 Sheets-Sheet 2

INVENTOR.
JOHN L. S. DALEY
BY
ATTORNEY

United States Patent Office 3,002,041
Patented Sept. 26, 1961

3,002,041
METHOD OF CONSTRUCTING NICKEL-CADMIUM CELLS
John L. S. Daley, Bay Village, Ohio, assignor to Union Carbide Corporation, a corporation of New York
Filed Aug. 10, 1959, Ser. No. 832,616
4 Claims. (Cl. 136—176)

This invention relates to an improved method of constructing sealed nickel cadmium secondary cells, and more particularly the invention relates to a method of constructing nickel cadmium cells of the type employing an anti-polar mass in the form of auxiliary negative electrodes.

It is well known in the art that a characteristic of positive nickel electrodes that are molded in the discharged state from nickelous hydroxide is that they will swell with great force upon discharging after their initial charge. The swelled electrode remains essentially undiminished in size even after subsequent recharging. This has been long considered a disadvantage and many mechanical devices, perhaps best typified by the Edison reinforced positive tube, have been built to resist this swelling and produce a stable electrode. Unfortunately, such devices generally reduce electrode efficiency due to the manner in which they are applied.

The principal object of the invention is to provide a method of constructing sealed nickel cadmium secondary cells wherein the disadvantages of the prior art associated with attempts to restrict the swelling phenomenon of positive electrodes are avoided.

Broadly stated the principal object of the invention is accomplished by providing a method of constructing nickel cadmium cells wherein the swelling phenomenon of positive nickel electrodes is utilized to advantage to produce an improved cell.

More specifically, the invention is based upon the unexpected discovery that a properly controlled swelling of the positive electrode of a nickel cadmium cell is very beneficial in improving its electrical characteristics. It has been found that the output from a given positive nickel electrode increases, as swelling is permitted to increase, eventually reaching a maximum followed by a sharp decrease. The output of the positive electrode is improved more than 100 percent at the point of maximum beneficial swelling over a tightly restrained, but otherwise identical, electrode.

In the practice of the invention for any given cell construction, the positive electrode should be permitted to swell to the extent that output is maximum under the desired current withdrawal conditions. The output depends upon both the electrolytic efficiency, which tends to improve upon swelling of the electrode, and electronic conductivity which decreases as swelling is permitted. The particular amount of swelling which should be permitted in a given electrode depends upon the general range of the discharge current for which the cell is intended. This is true, since the optimum of electronic conductivity and electrolytic efficiency is the point of maximum output and electronic conductivity has a greater effect on performance at high currents and electrolytic efficiency has the greater effect at low currents. Once it has been determined for what use the cell is intended, it is a simple matter for one skilled in the art to follow the teaching of this invention and fix the amount of swelling which should be permitted to achieve maximum output.

Due to the above reasons, the various components of nickel cadmium cells constructed according to the method of the invention, are dimensioned to fit loosely within the cell container upon assembling and sealing to permit the positive electrode to swell the optimum amount upon its initial discharge.

Figure 2:
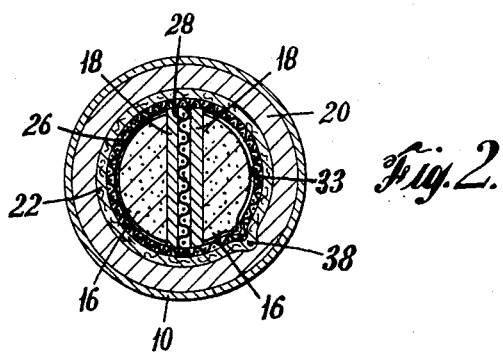
Figure 3:
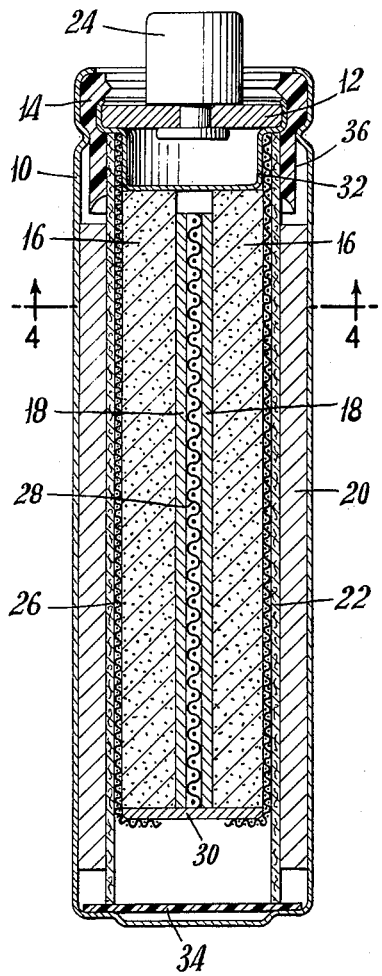
Figure 4:
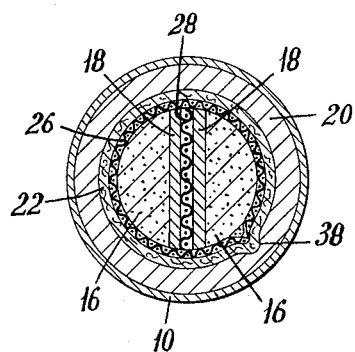

The invention will be more readily understood by reference to the accompanying drawing, wherein:

FIG. 1 is a vertical section of the preferred embodiment of a sealed nickel cadmium rechargeable cell constructed according to the principles of the invention;
FIG. 2 is a view taken along the line 2—2 of FIG. 1;
FIG. 3 is a vertical section of the cell of FIG. 1 after the positive electrode has swelled upon initial cycling of the cell; and
FIG. 4 is a view taken along the line 4—4 of FIG. 3.

The illustrated cell is a cell embodying the improved construction of nickel cadmium cells of the type employing an antipolar mass in the form of auxiliary electrodes set forth in my copending application "Sealed Nickel Cadmium Cell," U.S. Serial No. 832,556, now U.S. Patent 2,980,747, issued April 18, 1961, filed concurrently herewith. However, the advantages realized by the method of the invention are not limited to this type cell and apply equally to all nickel cadmium cells.

Referring now to the drawing, a sealed nickel cadmium cell constructed according to the principles of the invention comprises a container 10, a container cover 12, both suitably of nickel or nickel plated steel, a seal gasket 14 of a hard nylon composition interposed between the container 10 and container cover 12, a positive electrode 16, made up of two semi-cylindrically shaped pieces between which auxiliary negative electrodes 18 are located, a negative electrode 20, and a separator 22 interposed between the positive electrode 16 and the negative electrode 20. The positively charged container cover 12 is fitted with an external positive terminal 24, and the cell container 10 has an insulating member 34 disposed internally across its bottom.

The individual pieces which make up the positive electrode 16 may suitably be molded from an electrolyte-moist powdered mixture of nickel hydroxide and natural flake graphite powders. The latter provides an electrically conductive matrix within the pieces. Suitably, the pieces may be molded from a milled mixture of 75 parts by weight nickelous hydroxide and 25 parts by weight graphite powder, blended with 10 to 15 parts by weight 35 percent potassium hydroxide aqueous electrolyte. The positive electrode pieces molded from this mixture are in a fully discharged state.

The negative electrode 20 may suitably be fabricated from a nickel screen to which powders of nickel are sintered to form a porous nickel plaque. The plaque is impregnated with a solution of cadmium nitrate and subsequently heated to thermally decompose the impregnated cadmium nitrate to cadmium oxide. Prior to use in the cell, it is preferred to convert the cadmium oxide to cadmium hydroxide electrolytically in a potassium hydroxide electrolyte bath. Prior to insertion within a cell, the negative electrode 20 is rolled to a suitable diameter.

The auxiliary electrodes 18 are preferably flat sintered nickel cadmium hydroxide impregnated plaques which are fabricated in the same manner as the negative electrode 20 described above. Both the negative electrode 20 and auxiliary electrodes 18 are in the fully discharged state when placed in a cell.

The auxiliary negative electrodes 18 are separated by a spacer screen 28 and are disposed between the two pieces of the positive electrode 16. The spacer screen 28, separating the auxiliary electrodes 18, is preferably a nickel screen of sufficient thickness to provide a gas space between the auxiliary electrodes 18. The assembly of the positive electrode 16 and the auxiliary electrodes 18 is contained within a fine mesh nickel screen tube 26 which serves as both a current collector and a container.

The tube 26 is provided with a nickel disc 30, which covers the bottom of the tube 26. A generally cup-shaped nickel or nickel plated steel cap 32, the upper portion of which is stepped out to receive the container cover 12, is secured to the top of the tube 26, preferably by welding, and forms part of the seal closure of the cell, thereby providing a continuous surface of nickel below the cell container cover 12.

As stated above, when constructing a cell according to the method of the invention the various components of the cell are dimensioned to fit loosely within the container 10 upon assembling and sealing, so that the positive electrode 16 may swell the optimum amount upon the initial discharge without fear of bursting the screen tube 26. Initially, the positive electrode 16 and auxiliary negative electrodes 18 are assembled as a unit prior to insertion into the cell container 10. The nickel screen tube 26 is shaped and the bottom disc 30 is secured thereto, as by welding, and then the assembly of the positive electrode 16 and the auxiliary negative electrodes 18 with the spacer screen 28 properly in place, is inserted into the tube 26 and the top cap 32 is secured, as by welding to the open end. As shown in FIGS. 1 and 2, a space 33 is left between the positive electrode 16 and the nickel screen tube 26 to permit the positive electrode 16 to swell the optimum amount. The separator 22 and the negative electrode 20 are wrapped around this unit and with the seal gasket 14 and cover 12 in place the assembled elements are placed within the container 10, which already has the bottom insulating disc 34 in place, as well as a proper additional amount of potassium hydroxide electrolyte above that already contained in the molded positive electrode 16. Preferably, in the practice of the invention, the seal gasket 14 has a depending annular flange 36 which prohibits electrocapillary action from taking place across the oppositely charged cell container 10 and cover 12, and the cell container is sealed by radially compressing the gasket 14 between the container 10 and the container cover 12, under a high radial force substantially equivalent to, but not greater than, the yield strength of the container 10.

In way of illustration, an assembly of an "AA" size nickel-cadmium cell is given as a specific example of the practice of the invention; size "AA" being defined in circular C466 of the National Bureau of Standards of the United States Department of Commerce.

A size "AA" nickel cadmium cell designed for maximum medium rate output achieves maximum output when the particular molded positive electrode discussed above is permitted to swell approximately 12 percent by volume after the cell is assembled. To obtain this desired amount of swelling, the positive electrode assembly including the auxiliary electrodes and spacer screen was made 0.335 inch thick; a spacer screen 0.025 inch thick was suitable to provide an adequate gas space. The fine nickel mesh screen tube into which the assembly was inserted was made 0.355 inch in inside diameter and 0.01 inch thick (this inside diameter was decreased to 0.350 inch upon insertion within the cell container, the excess material being taken up by the wrinkle 38, as shown in FIGS. 2 and 4). The separator was 0.020 inch thick, the negative electrode was .050 inch thick, and the container had an inside diameter of .510 inch. From these dimesions it may be seen that the various parts of the nickel cadmium cell fitted into place, as described above, with ease.

The cell, immediately following the radial sealing described above, did not have the potassium hydroxide electrolyte properly distributed throughout the positive electrode and was of relatively high resistance due to the loose fits. All that was necessary to place the cell ready for useful life after assembly and sealing was one charge and discharge. During the cycle, the positive electrode swelled approximately 12 percent by volume to a diameter of 0.350 inch. As noted above, the screen tube had a diameter of 0.355 inch originally and therefore it did not act as a restrainer, but rather as a current collector with a secondary function as a sieve which prevents solids from washing out of the positive electrode. The restraint applied to the positive electrode to prevent it from swelling beyond the maximum output diameter of 0.350 inch was supplied by the container acting via the negative electrode and the separator.

The fact that the screen tube is not a restraining member for the positive electrode permits it to be fabricated from more fragile and more open screen material than in cells now available, thus, saving space and reducing cost without any fear of bursting. In addition, since more of the positve electrode face area may be exposed due to the more open screen materials that may be used, the current carrying capabilities of the positive electrode are improved. Furthermore, the cell of the invention utilizes the phenomenon of positive electrode swelling upon initial discharging of the cell, which has been a great problem in the art, to both simplify assembly and improve service characteristics.

What is claimed is:

1. In a method of assembling a sealed nickel cadmium secondary cell which comprises as components a container, a cover for said container, a seal gasket therebetween; a negative cadmium electrode, a positive nickel electrode, a separator between said positive electrode and said negative electrode and an alkaline electrolyte throughout; the improvement which comprises dimensioning said components to fit loosely within said container upon assembling said cell in order that said positive electrode is free to swell to approximately the point of optimum electronic conductivity and electrolytic efficiency to achieve maximum output upon the initial cycling of said cell subsequent to the sealing of said cell; said dimensions of said components being such that said swelling results in tight intra-cell contacts when further swelling of said positive electrode is constrained by said negative electrode and said container.

2. In a method of assembling a sealed nickel cadmium secondary cell which comprises a container, a cover for said container, a seal gasket therebetween, a negative cadmium electrode, a positive nickel electrode consisting of two semi-cylindrical pieces, two auxiliary electrodes of a cathodic reducible oxide which are separated by a spacer screen and are located between and in juxtaposition with the flat surfaces of said semi-cylindrical pieces, a separator between said positive electrode and said negative electrode, and an alkaline electrolyte throughout; the improvement which comprises dimensioning said components to fit loosely within said container upon assembling said cell in order that said positive electrode is free to swell to approximately the point of optimum electronic conductivity and electrolytic efficiency to achieve maximum output upon the initial cycling of said cell subsequent to the sealing of said cell; said dimensions of said components being such that said swelling results in tight intra-cell contacts when further swelling of said positive electrode is constrained by said negative electrode and said container.

3. In a method of assembling a sealed nickel cadmium secondary cell which comprises as components a container, a cover for said container, a seal gasket having a depending annular flange radially sealed therebetween, a negative electrode comprising a sintered nickel plaque impregnated with a material chosen from the group consisting of cadmium oxide and cadmium hydroxide, a positive electrode molded from a mixture which comprises nickel hydroxide, natural flaked graphite powders and potassium hydroxide, and consisting of two semi-cylindrical pieces, two auxiliary electrodes comprising sintered nickel plaques impregnated with a material chosen from the group consisting of cadmium oxide and cadmium hydroxide which are separated by a spacer screen and are located between and in juxtaposition with the flat surfaces of said semi-cylindrical pieces, a separator between said positive electrode and said negative electrode and potassium hydroxide electrolyte throughout; the improvement which comprises dimensioning said components to fit loosely within said container upon assembling said cell in order that said positive electrode is free to swell to approximately the point of optimum electronic conductivity and electrolytic efficiency to achieve maximum output upon the initial cycling of said cell subsequent to the sealing of said cell; said dimensions of said components being such that said swelling results in tight intracell contacts when further swelling of said positive electrode is constrained by said negative electrode and said container.

4. In a method of assembling a sealed nickel cadmium secondary cell which comprises as components a container, a cover for said container, a seal gasket having a depending annular flange radially sealed therebetween, a negative electrode comprising a sintered nickel plaque impregnated with cadmium hydroxide, a positive electrode molded from a mixture which comprises nickel hydroxide, natural flaked graphite powders and potassium hydroxide, and consisting of two semi-cylindrical pieces, two auxilary electrodes comprising sintered nickel plaques impregnated with cadmium hydroxide which are separated by a nickel spacer screen and are located between and in juxtaposition with the flat surfaces of said semi-cylindrical pieces, said semi-cylindrical pieces of said positive electrode being inclosed in a fine mesh nickel tube, said tube being inclosed by a nickel disc at the bottom and by a nickel cup shaped member in contact with the cell cover at the top, a nylon separator between said fine mesh nickel tube and said negative electrode, and potassium hydroxide electrolyte throughout; the improvement which comprises dimensioning said components to fit loosely within said container upon assembling said cell in order that said positive electrode is free to swell to approximately the point of optimum electronic conductivity and electrolytic efficiency to achieve maximum output upon the initial cycling of said cell subsequent to the sealing of said cell; said dimensions of said components being such that said swelling results in tight intracell contacts when further swelling of said positive electrode is constrained by said negative electrode and said container.

References Cited in the file of this patent

UNITED STATES PATENTS

| | | |
|---|---|---|
| 2,675,418 | Nichols | Apr. 13, 1954 |
| 2,696,515 | Koren et al. | Dec. 7, 1954 |
| 2,708,212 | Koren et al. | May 10, 1955 |